US011119870B2

(12) United States Patent
Okuno et al.

(10) Patent No.: US 11,119,870 B2
(45) Date of Patent: Sep. 14, 2021

(54) CALCULATOR, CLUSTER MANAGEMENT SYSTEM, METHOD, AND NON-TRANSITORY COMPUTER READABLE MEDIUM

(71) Applicant: NEC Corporation, Tokyo (JP)

(72) Inventors: Yusuke Okuno, Tokyo (JP); Takamasa Ohtake, Tokyo (JP)

(73) Assignee: NEC CORPORATION, Tokyo (JP)

( * ) Notice: Subject to any disclaimer, the term of this patent is extended or adjusted under 35 U.S.C. 154(b) by 120 days.

(21) Appl. No.: 16/335,072

(22) PCT Filed: Sep. 5, 2017

(86) PCT No.: PCT/JP2017/031876
§ 371 (c)(1),
(2) Date: Mar. 20, 2019

(87) PCT Pub. No.: WO2018/056044
PCT Pub. Date: Mar. 29, 2018

(65) Prior Publication Data
US 2019/0266059 A1    Aug. 29, 2019

(30) Foreign Application Priority Data

Sep. 21, 2016 (JP) ............................. JP2016-184515

(51) Int. Cl.
*G06F 11/16* (2006.01)
*G06F 11/07* (2006.01)
(Continued)

(52) U.S. Cl.
CPC ...... *G06F 11/1625* (2013.01); *G06F 11/0709* (2013.01); *G06F 11/0757* (2013.01);
(Continued)

(58) Field of Classification Search
CPC .. G06F 11/1625; G06F 11/20; G06F 11/0709; G06F 11/0757; G06F 11/0772;
(Continued)

(56) References Cited

U.S. PATENT DOCUMENTS 8,041,735 B1 * 10/2011 Lacapra ................ G06F 16/182
707/783
2003/0233502 A1   12/2003 Murotani et al.
(Continued)

FOREIGN PATENT DOCUMENTS

JP     2004-021556 A     1/2004
JP     2004-199682 A     7/2004
(Continued)

OTHER PUBLICATIONS

International Search Report for PCT Application No. PCT/JP2017/031876, dated Nov. 21, 2017.

*Primary Examiner* — Yair Leibovich

(57) ABSTRACT

To achieve mutual monitoring of an operating state in consideration of an object storage. A calculator (10) according to the invention, which forms a cluster together with another calculator (20), includes a storage request unit (11) that requests an object storage (30) that manages data on an object-by-object basis to store first state information indicating a normal state of its own calculator, an acquisition request unit (12) that requests the object storage (30) to acquire second state information indicating a normal state of the other calculator (20), and a cluster control unit (13) that performs cluster control based on a result of storing the first state information and a result of acquiring the second state information, and when a result of acquiring the second state information is not the latest result, the acquisition request unit (12) requests acquisition of the second state information a specified number of times.

8 Claims, 13 Drawing Sheets

(51) Int. Cl.
  *G06F 11/14* (2006.01)
  *G06F 11/30* (2006.01)
  *H04L 29/08* (2006.01)
  *G06F 11/20* (2006.01)

(52) U.S. Cl.
  CPC ...... *G06F 11/0772* (2013.01); *G06F 11/0778* (2013.01); *G06F 11/1443* (2013.01); *G06F 11/20* (2013.01); *G06F 11/3006* (2013.01); *H04L 67/1034* (2013.01)

(58) Field of Classification Search
  CPC ............ G06F 11/0778; G06F 11/1443; G06F 11/3006; G06F 11/2094; G06F 11/3055; H04L 67/1034
  USPC .......................................................... 714/3
  See application file for complete search history.

(56) References Cited

U.S. PATENT DOCUMENTS

2004/0123050 A1    6/2004  Knop et al.
2005/0246393 A1*  11/2005  Coates ................ H04L 67/1097
2013/0054932 A1*   2/2013  Acharya ................ G06F 3/067
                                                                711/202

FOREIGN PATENT DOCUMENTS

JP    2008-299369 A    12/2008
JP    2014-109973 A     6/2014

* cited by examiner

Fig. 7

```
PUT /server300-2016-04-25-161135.json HTTP/1.1
Host: myBucket.s3.amazonaws.com
Date: Mon, 25 Apr 2016 16:11:35 JST
Authorization: <AUTHENTICATION INFORMATION>
Content-Type: text/plain
Content-Length: 93
{
    "time": "2016/04/25 16:11:35",
    "timezone":  "UTC+9",
    "status": "Normal"
}
```

Fig. 8

| PATH OF FILE (OBJECT) | CONTENT OF FILE (OBJECT) |
|---|---|
| /server300-2016-04-25-161030.json | { "time" : " 2016/04/25 16:10:30 ", "timezone" : " UTC+9 ", "status" : " Normal " } |
| /server300-2016-04-25-161135.json | { "time" : " 2016/04/25 16:11:35 ", "timezone" : " UTC+9 ", "status" : " Normal " } |
| /server350-2016-04-25-161120.json | { "time" : " 2016/04/25 16:11:20 ", "timezone" : " UTC+9 ", "status" : " Normal " } |

```
DELETE /server300-2016-04-25-161030.json HTTP/1.1
Host: myBucket.s3.amazonaws.com
Date: Mon, 25 Apr 2016 16:11:45 JST
Authorization: <AUTHENTICATION INFORMATION>
Content-Type: text/plain
Content-Length: 0
```

"HEARTBEAT INFORMATION FILE OF ANOTHER SERVER ACQUIRED LAST TIME"
STORED IN SERVER 300

| TARGET SERVER NAME | FILE (OBJECT) ACQUIRED LAST TIME |
|---|---|
| server350 | /server350-2016-04-25-161010.json |

"HEARTBEAT INFORMATION FILE OF ANOTHER SERVER ACQUIRED LAST TIME"
STORED IN SERVER 350

| TARGET SERVER NAME | FILE (OBJECT) ACQUIRED LAST TIME |
|---|---|
| server300 | /server300-2016-04-25-161030.json |

Fig. 12

```
GET /server300-2016-04-25-161135.json HTTP/1.1
Host: myBucket.s3.amazonaws.com
Date: Mon, 25 Apr 2016 16:15:00 JST
Authorization: <AUTHENTICATION INFORMATION>
```

| ID | TYPE | STATE | COMMUNICATION INTERVAL | NEED/NO NEED OF ADJUSTMENT |
|---|---|---|---|---|
| 400 | NORMAL HEARTBEAT CHANNEL | NORMAL | 10 SEC | NO NEED |
| 401 | NORMAL HEARTBEAT CHANNEL | NORMAL | 10 SEC | NO NEED |
| 100 | OBJECT STORAGE | NORMAL | 60 SEC | NEED |

Fig. 14

CALCULATOR, CLUSTER MANAGEMENT SYSTEM, METHOD, AND NON-TRANSITORY COMPUTER READABLE MEDIUM

This application is a National Stage Entry of PCT/JP2017/031876 filed on Sep. 5, 2017, which claims priority from Japanese Patent Application 2016-184515 filed on Sep. 21, 2016, the contents of all of which are incorporated herein by reference, in their entirety.

TECHNICAL FIELD

The present invention relates to a calculator, a cluster management system, a method and a program and, particularly relates to a calculator, a cluster management system, a method and a program for mutually monitoring the operating state.

BACKGROUND ART

A cluster system that includes a plurality of calculators capable of providing the same service in order to reduce the outage time of a service provided by the system is known. For example, Patent Literature 1 discloses a technique for improving the availability in a cluster system.

The cluster system according to Patent Literature 1 includes a plurality of nodes, two survival information storage devices, and one success/failure information storage device. Each of the node stores, during normal operation, survival information indicating that the node is operating normally into the reference survival information storage device, and stores the success/failure information indicating the reference survival information storage device and the success or failure of storage of survival information into the success/failure information storage device. Each of the nodes refers to the success/failure information and thereby determines whether to switch reference.

CITATION LIST

Patent Literature

PTL1: Japanese Unexamined Patent Application Publication No.
2008-299369

SUMMARY OF INVENTION

Technical Problem

In Patent Literature 1, main and sub-survival information storage devices are disposed so that the two survival information storage devices form a cluster structure, and further the success/failure information storage device is disposed. Therefore, the success/failure information storage device can serve as a bottleneck. In view of this, an object storage that is accessed through the Internet may be used as a location to store survival information.

The object storage makes replication of data internally for redundancy of a disk device and thereby ensures data availability in the event of disk failure. However, because the replication of data requires a certain amount of time, a new file cannot be referred to immediately after writing of this file. Therefore, the technique according to Patent Literature 1 cannot be simply replaced with the object storage.

The present invention has been accomplished to solve the above problem and an object of the present invention is thus to provide a calculator, a cluster management system, a method and a program for achieving mutual monitoring of an operating state in consideration of an object storage.

Solution to Problem

A calculator according to a first aspect of the present invention is a calculator forming a cluster together with an other calculator, which includes a storage request unit configured to request an object storage to store first state information indicating a normal state of the calculator, the object storage being configured to manage data on an object-by-object basis, an acquisition request unit configured to request the object storage to acquire second state information indicating a normal state of the other calculator, and a cluster control unit configured to perform cluster control based on a result of storing the first state information and a result of acquiring the second state information, wherein when a result of acquiring the second state information is not a latest result, the acquisition request unit requests acquisition of the second state information a specified number of times.

A cluster management system according to a second aspect of the present invention includes an object storage configured to manage data on an object-by-object basis, and a plurality of calculators configured to be able to communicate with the object storage through a network, wherein each of the plurality of calculators requests the object storage to store first state information indicating a normal state of the calculator, requests the object storage to acquire second state information indicating a normal state of another calculator forming a cluster together with the calculator, performs cluster control based on a result of storing the first state information and a result of acquiring the second state information, and requests the acquisition a specified number of times when a result of acquiring the second state information is not a latest result.

A cluster management method according to a third aspect of the present invention includes requesting an object storage to store first state information indicating a normal state of the calculator, the object storage being configured to manage data on an object-by-object basis, requesting the object storage to acquire second state information indicating a normal state of another calculator forming a cluster together with the calculator, performing cluster control based on a result of storing the first state information and a result of acquiring the second state information, and requesting acquisition of the second state information a specified number of times when a result of acquiring the second state information is not a latest state information is not a latest result A cluster management program according to a fourth aspect of the present invention causes a computer to execute processing of requesting an object storage to store first state information indicating a normal state of the calculator, the object storage being configured to manage data on an object-by-object basis, processing of requesting the object storage to acquire second state information indicating a normal state of another calculator forming a cluster together with the calculator, processing of performing cluster control based on a result of storing the first state information and a result of acquiring the second state information, and processing of requesting acquisition of the second state information a specified number of times when a result of acquiring the second state information is not a latest result.

Advantageous Effects of Invention

According to the present invention, it is possible to provide a calculator, a cluster management system, a method and a program for achieving mutual monitoring of an operating state in consideration of an object storage.

BRIEF DESCRIPTION OF DRAWINGS

FIG. 7 is a view showing an example of a storage request according to the second embodiment of the present invention.

FIG. 8 is a view showing an example of a list of heartbeat information files according to the second embodiment of the present invention.

FIG. 9 is a view showing an example of a deletion request according to the second embodiment of the present invention.

FIG. 11 is a view showing an example of a heartbeat information file of another server acquired last time according to the second embodiment of the present invention.

FIG. 12 is a view showing an example of an acquisition request according to the second embodiment of the present invention.

FIG. 14 is a view showing an example of a heartbeat communication channel table according to the third embodiment of the present invention.

DESCRIPTION OF EMBODIMENTS

Specific embodiments of the present invention will be described hereinafter in detail with reference to the drawings. The same or corresponding elements are denoted by the same symbols throughout the drawings, and duplicated explanations are omitted as necessary for the sake of clarity.

First Embodiment

Figure 1:
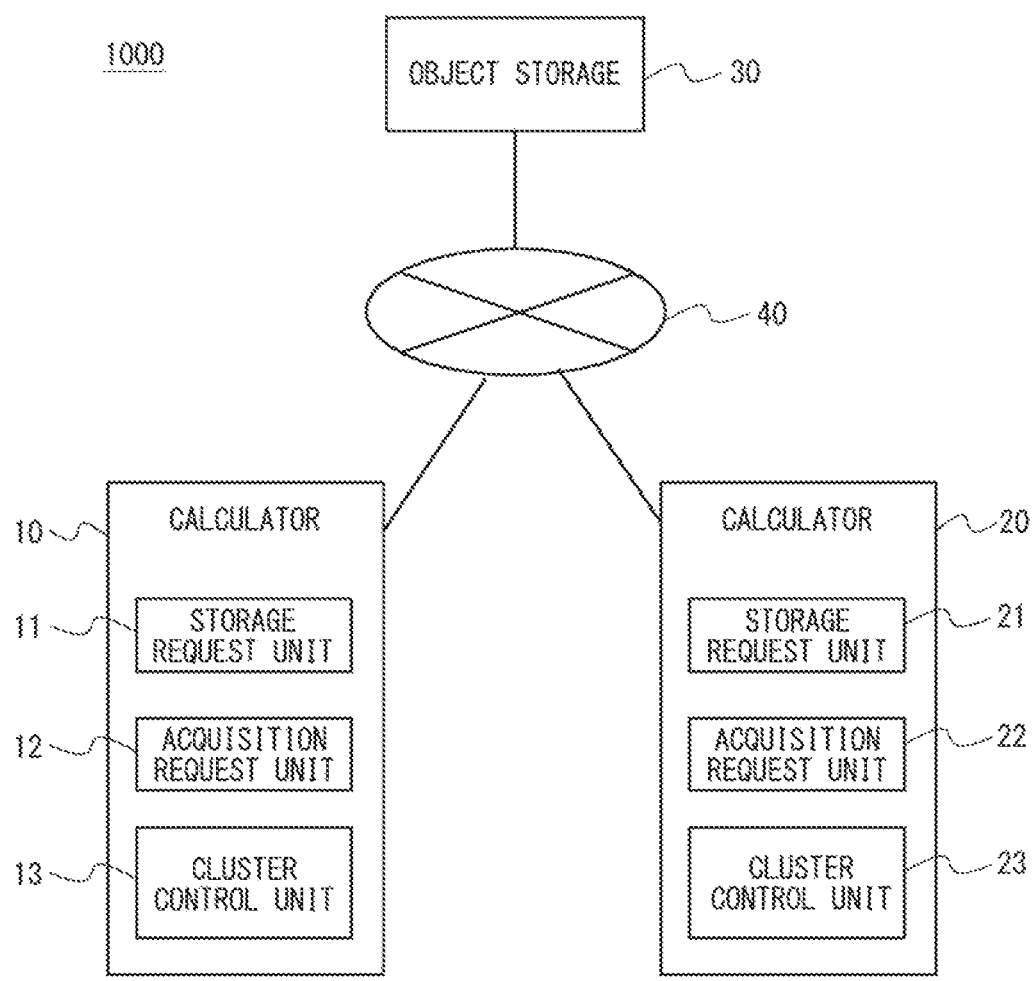
FIG. 1 is a block diagram showing the overall configuration of a cluster management system according to a first embodiment of the present invention.

FIG. 1 is a block diagram showing the overall configuration of a cluster management system 1000 according to a first embodiment of the present invention. The cluster management system 1000 includes a calculator 10, a calculator 20, an object storage 30, and a network 40. The calculators 10 and 20 and the object storage 30 are connected through the network 40. Thus, the calculators 10 and 20 can communicate with the object storage 30 through the network 40. The number of calculators may be three or more.

The network 40 is a communication network that is open outside, such as the Internet, for example. The object storage 30 is a storage system that manages data on an object-by-object basis. The object storage 30 is provided as a cloud service, and it can be accessed in common from each server through an API (Application Programming Interface) to store files. The object storage 30 is redundant in a storage system.

The calculator 10 forms a cluster together with the other calculator 20. The calculator 10 includes a storage request unit 11, an acquisition request unit 12, and a cluster control unit 13. The storage request unit 11 requests the object storage 30 to store first state information indicating a normal state of its own calculator 10. The acquisition request unit 12 requests the object storage 30 to acquire second state information indicating a normal state of the other calculator 20. The cluster control unit 13 performs cluster control based on a result of storing the first state information and a result of acquiring the second state information. When the result of acquiring the second state information is not the latest result, the acquisition request unit 12 requests acquisition of the second state information a specified number of times.

The calculator 20 includes a storage request unit 21, an acquisition request unit 22, and a cluster control unit 23. The components of the calculator 20 are the same as those of the calculator 10 and therefore not redundantly described in detail.

Figure 2:
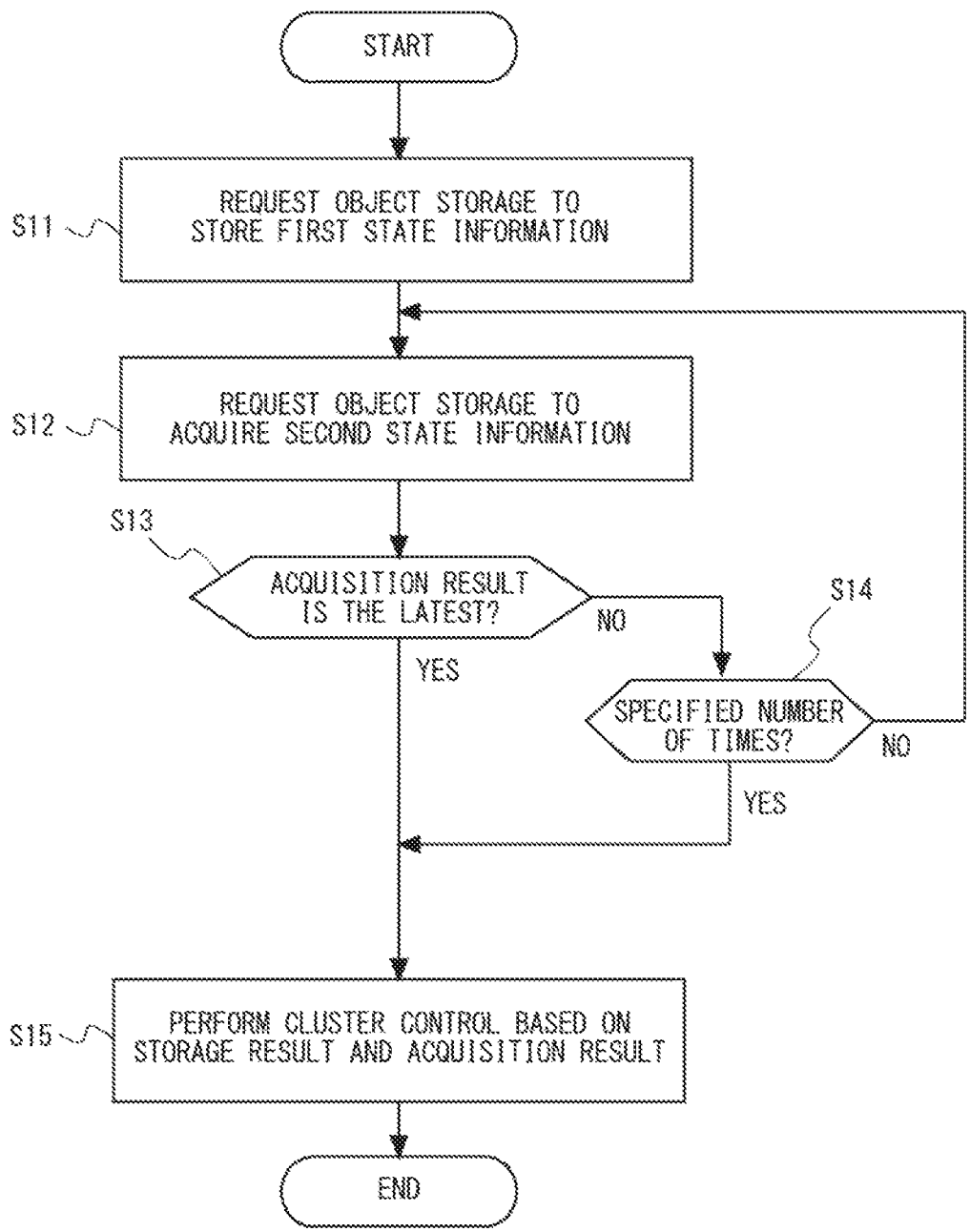
FIG. 2 is a flowchart showing the flow of a cluster control process according to the first embodiment of the present invention.

FIG. 2 is a flowchart showing the flow of a cluster control process according to the first embodiment of the present invention. First, the storage request unit 11 requests the object storage 30 to store the first state information (S11). Next, the acquisition request unit 12 requests the object storage 30 to acquire the second state information (S12). Then, the acquisition request unit 12 determines whether a result of acquiring the second state information is the latest result or not (S13). When the result of acquiring the second state information is not the latest result (No in S13), the acquisition request unit 12 determines whether the repetition of an acquisition request has occurred a specified number of times or not (S14). When the repetition of an acquisition request has occurred less than a specified number of times, the process performs Step S12 again. When, on the other hand, the repetition of an acquisition request has occurred a specified number of times or more, the process proceeds to Step S15.

On the other hand, when the result of acquiring the second state information is the latest result (Yes in S13), the cluster control unit 13 performs cluster control based on a result of storing the first state information and a result of acquiring the second state information (S15). For example, when storing the first state information has failed, it is likely that abnormality is occurring in network communication in the calculator 10, and there is a possibility that the calculator 10 cannot provide a normal service. Therefore, the cluster control unit 13 determines that the calculator 10 is in an abnormal state and performs cluster control. Further, when the calculator 10 is currently a standby system and a result of acquiring the second state information is not the latest result, the calculator 20 is likely to be in an abnormal state, and therefore the cluster control unit 13 switches the calculator 10 to an active system.

In this manner, mutual monitoring of the operating state in consideration of redundancy of the object storage is enabled in this embodiment.

In the case of an existing cluster system, if a plurality of servers that form a cluster system are isolated due to a failure of a communication channel for heartbeat communication ("network partition"), a state that is inconsistent as a cluster, such as where the same service is started in the plurality of servers to cause destruction of data, occurs. Such a state is called "split-brain".

As one technique to deal with network partition (suppress the occurrence of split-brain), a technique that carries out read/write on a shared disk connected to a plurality of servers and thereby determines whether a server at the other end is down or heartbeat communication is interrupted due to a failure of a communication channel (disk heartbeat) is known.

Recently, "cloud hosting service" that allows use of a vertical server or a calculator resource as a service has been provided by various companies. By using this service, it is possible to form a long-distance cluster system by combination of "an in-house (on-premises) physical server" and "a vertical server in an external cloud hosting service" or combination of "a vertical server located in the west coast of the United States" and "a vertical server located in the east coast of the United States".

It is, however, not practical that servers in remote locations connect to one shared disk as described above due to physical restrictions or costs. Therefore, the above-described technique of disk heartbeat is not easily applicable when a plurality of servers forming a cluster system are located distant from one another.

In view of the foregoing, the object storage 30 is used in the first embodiment, which makes it possible to overcome network partition and allow servers in remote locations to operate, mutually monitoring each other.

Second Embodiment

A second embodiment is a specific embodiment of the above-described first embodiment.

Figure 3:
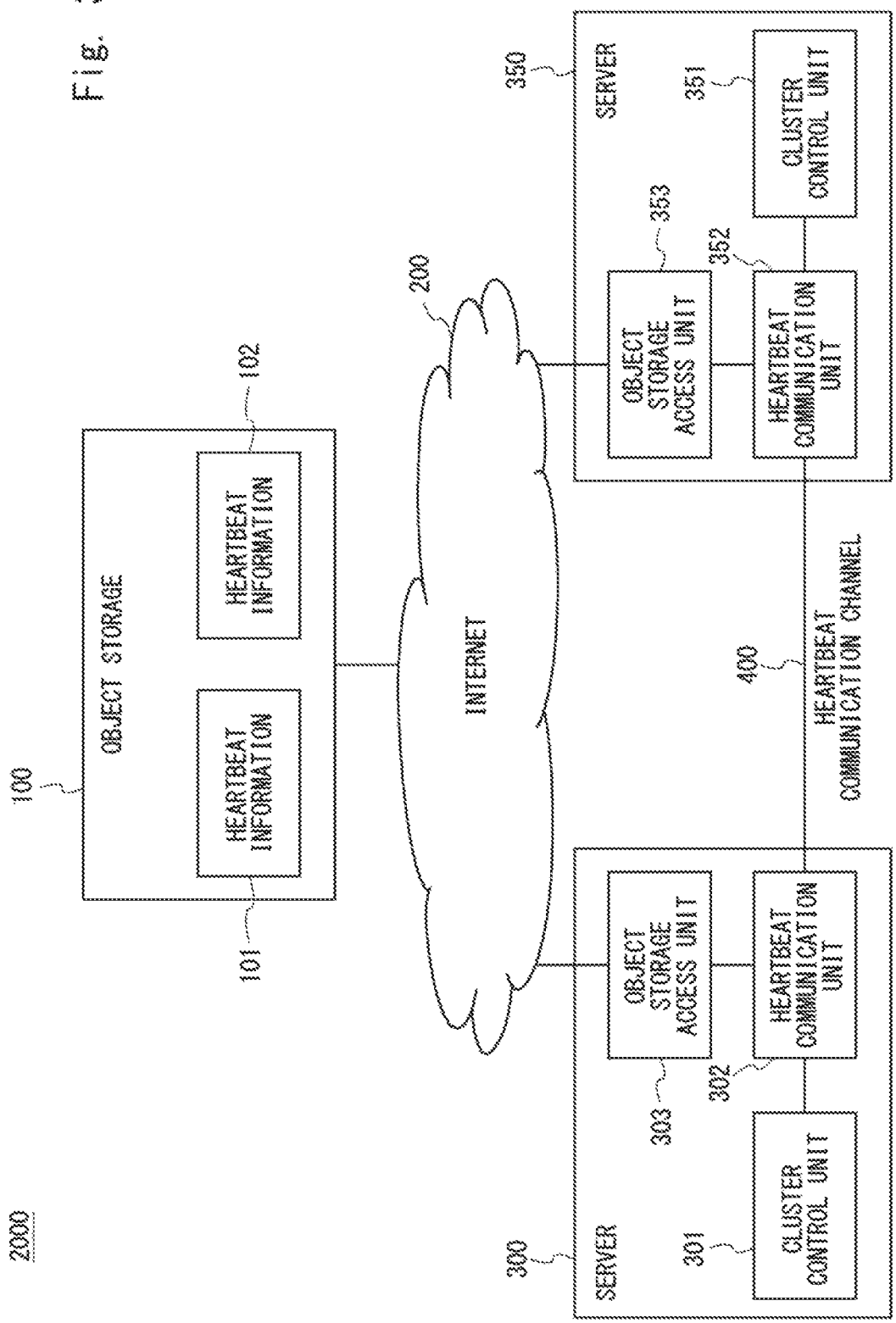
FIG. 3 is a block diagram showing the configuration of a cluster management system according to a second embodiment of the present invention.

FIG. 3 is a block diagram showing the configuration of a cluster management system 2000 according to the second embodiment of the present invention. The cluster management system 2000 includes a server 300, a server 350, an object storage 100, and the Internet 200. The servers 300 and 350 and the object storage 100 are connected through the Internet 200. Further, the servers 300 and the server 350 are connected through a heartbeat communication channel 400. The object storage 100 is the same as the above-described object storage 30. The Internet 200 is an example of the above-described network 40.

The server 300 includes a cluster control unit 301, a heartbeat communication unit 302, and an object storage access unit 303. The cluster control unit 301 carries out alive monitoring of another server by using the heartbeat communication unit 302 and thereby grasps the state of each of the servers forming a cluster.

The heartbeat communication unit 302 has the function of sending and receiving a heartbeat to and from another server through the heartbeat communication channel 400. Further, the heartbeat communication unit 302 requests the object storage access unit 303 to store information corresponding to a heartbeat in its own server into the object storage 100.

The heartbeat communication unit 302 also requests the object storage access unit 303 to acquire information corresponding to a heartbeat in another server from the object storage 100.

The object storage access unit 303 generates a heartbeat information file of its own server in response to a request from the heartbeat communication unit 302, and requests the object storage 100 to store the heartbeat information file of its own server. Further, the object storage access unit 303 makes a request to acquire a heartbeat information file of another server stored in the object storage 100 in response to a request from the heartbeat communication unit 302.

The flow of a normal heartbeat communication process is described hereinafter with reference to FIG. 4.

(S001) The cluster control unit 301 of the server 300 requests the heartbeat communication unit 302 to send a heartbeat in order to notify another server forming the cluster management system 2000 of the state of its own server.

(S002) The heartbeat communication unit 302 sends a heartbeat to a heartbeat communication unit 352 of the server 350 through the heartbeat communication channel 400.

(S003) The heartbeat communication unit 352 notifies a cluster control unit 351 that a heartbeat is received from the server 300.

(S004) The cluster control unit 351 updates the alive status of the server 300 to "normal state" in accordance with a notification of receipt of a heartbeat from the heartbeat communication unit 352.

A heartbeat from the server 350 to the server 300 is sent in the same manner.

In this operation, the server 300 and the server 350 can monitor the alive status of each other's server through the heartbeat communication channel 400.

Assume the case where a failure such as breaking occurs in the heartbeat communication channel 400 to make it impossible to send and receive a heartbeat directly between the server 300 and the server 350. In this case, a heartbeat from the other server is stopped. The flow of a process in the event of timeout is described hereinafter with reference to FIG. 5.

(S101) The heartbeat communication unit 352 measures the elapsed time from the last time a heartbeat from the server 300 is received. Then, the heartbeat communication unit 352 checks whether the elapsed time reaches a specified timeout time or not. When the timeout time is reached, the process proceeds to Step S103, and when not reached, the process proceeds to Step S102.

(S102) The heartbeat communication unit 352 waits for a specified time, and then proceeds to Step S101 to check the elapsed time again.

(S103) Because a specified timeout time is reached, the heartbeat communication unit 352 notifies the cluster control unit 351 that a heartbeat from the server 300 cannot be received.

(S104) The cluster control unit 351 updates the alive status of the server 300 to "abnormal state". The operation when the server 300 waits for a heartbeat from the server 350 and the timeout time is reached is performed in the same manner as above.

A heartbeat communication process (storage) through the object storage according to the second embodiment of the present invention is described hereinafter with reference to FIG. 6. Note that a heartbeat communication process (storage) through the object storage by the server 350 is performed in the same manner.

(S201) The cluster control unit 301 of the server 300 requests the heartbeat communication unit 302 to send a heartbeat in order to notify the other server forming the cluster management system 2000 of the state of its own server.

(S202) The heartbeat communication unit 302 requests the object storage access unit 303 to store a heartbeat information file (which is described in detail later) into the object storage 100.

(S203) The object storage access unit 303 requests the object storage 100 to store a heartbeat information file. The heartbeat information file is data having information such as "the heartbeat information file creation time", "the time zone of the server" and "the state of the server". Although the data structure of JSON (JavaScript (registered trademark) Object Notation) is described below as an example of implementation, it may be another data structure (e.g., XML (Extensible Markup Language) or YAML (YAML Ain't Markup Language) etc.). In order to store the heartbeat information file into the object storage, the object storage access unit 303 sends an HTTP request as shown in FIG. 7.

FIG. 7 is a view showing an example of a storage request according to the second embodiment of the present invention. The HTTP request of FIG. 7 assumes the use of Amazon S3 (Amazon Simple Storage Service) (registered trademark) as an example of the object storage.

(S203-1) The object storage access unit 303 determines whether storing a heartbeat information file into the object storage 100 is successful or not. When storing a heartbeat information file is successful, the process proceeds to Step S204. When, on the other hand, storage has failed, the process proceeds to Step S203-2.

When a heartbeat information file is stored from the server 300 and the server 350 into the object storage 100, data stored in the object storage 100 is as shown in FIG. 8. FIG. 8 is a view showing an example of a list of heartbeat information files according to the second embodiment of the present invention. For the file name of a heartbeat information file, "date+time" or "UNIX (registered trademark) time" is used so that the latest file is distinguishable from the other files.

(S204) The object storage access unit 303 checks a list of heartbeat information files of its own server stored in the object storage 100 to find whether there is a file that is older than the file stored most recently. When such a file exists, the process proceeds to Step S205, and when it does not exist, the process ends.

The "list of heartbeat information files" is a list of paths of files (objects) in FIG. 8. A server name is used as a part of the path, and whether it is a heartbeat information file of its own server can be determined by referring to it.

(S205) The object storage access unit 303 sends the HTTP request as shown in FIG. 9 in order to delete an "old heartbeat information file of its own server" stored in the object storage 100. FIG. 9 is a view showing an example of a deletion request according to the second embodiment of the present invention. The HTTP request in FIG. 9 assumes the use of Amazon S3 (registered trademark) as an example of the object storage.

(S203-2) When storing a heartbeat information file into the object storage 100 has failed in Step S203-1, the cluster control unit 301 updates the status of its own server to an abnormal state. This is the case where communication becomes unavailable between the server 300 and the object storage 100, and communication remains available between the other server 350 and the object storage 100. In such a case, the server 300 determines that its own server is isolated in a network (abnormal state).

Figure 6:
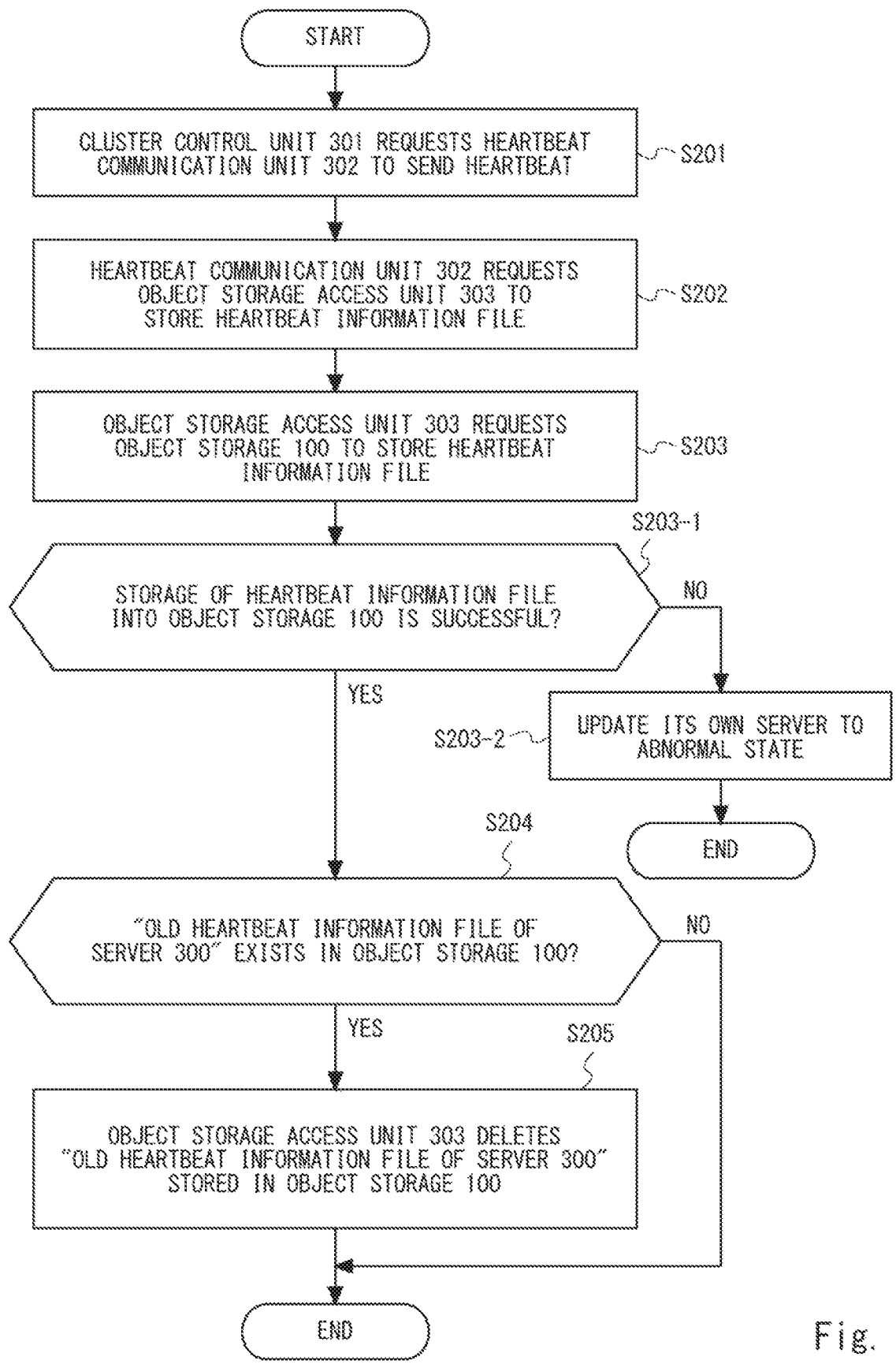
FIG. 6 is a flowchart showing the flow of a heartbeat communication process (storage) through an object storage according to the second embodiment of the present invention.

On the other hand, because the server 350 is in the state of being able to communicate with the object storage 100, it is determined in S203-1 of FIG. 6 that storage is successful, and the subsequent operations are executed normally. When both of the server 300 and the server 350 become unable to communicate with the object storage 100, the both servers determine that they are isolated in a network (abnormal state).

The flow of a heartbeat communication process (acquisition) through the object storage according to the second embodiment of the present invention is described hereinafter with reference to FIG. 10. Note that a heartbeat communication process (acquisition) through the object storage by the server 300 is performed in the same manner.

(S301) The heartbeat communication unit 352 of the server 350 requests the object storage access unit 353 to acquire the heartbeat information file stored in the object storage 100.

(S302) The object storage access unit 353 acquires a list of files stored in the object storage 100.

(S302-1) The object storage access unit 353 determines whether acquisition of a list of files is successful or not. When the processing in Step S302 is successful, the process proceeds to Step S303. When, on the other hand, the processing in Step S302 has failed, the process proceeds to Step S302-2.

(S302-2) When acquisition of a list of heartbeat information files from the object storage 100 has failed in Step S302-1, the cluster control unit 351 updates the status of its own server to an abnormal state.

(S303) The object storage access unit 353 stores the name of the heartbeat information file of the other server acquired last time as shown in FIG. 11. FIG. 11 is a view showing an example of a heartbeat information file of another server acquired last time according to the second embodiment of the present invention. Because the file name can be obtained by reading the acquired list of files, the object storage access unit 353 can determine whether the file is the latest one based on the file name of the heartbeat information file and can thereby identify the "latest heartbeat information file of the other server"

(S304) The object storage access unit 353 determines whether the latest heartbeat information file of the other server exists or not. When the latest heartbeat information file of the other server exists, the process proceeds to Step S308. When it does not exist, the process proceeds to S305.

(S305) When the latest heartbeat information file does not exist in the object storage 100, the object storage access unit 353 executes retry a specified number of times. When the number of times of retry reaches a threshold, the process ends without performing anything after that and moves on to the operation in the event of timeout shown in FIG. 5. In this case, since the latest heartbeat information file is not stored (a heartbeat is stopped) from the server 300, the alive status of the server 300 is updated to "abnormal state". When, on the other hand, the number of times of retry does not reach a threshold, the process proceeds to Step S306.

Retry is the operation that takes the mechanism of "redundancy", which is employed in typical object storages, into consideration. In many object storages, data availability in the event of disk failure is guaranteed by replicating data. This is because the replication of data requires a certain amount of time, and there is a case where an added file (object) is not displayed if a list of files (objects) is displayed immediately after writing a new file (object), for example.

(S306) The object storage access unit 353 waits for a specified amount of time.

(S307) The object storage access unit 353 increments the retry count and executes Step S302 again.

(S308) When the corresponding file exists in Step S304, the object storage access unit 353 acquires the "latest heartbeat information file of the other server" stored in the object storage 100. An HTTP request for this acquisition is in the format as shown in FIG. 12. FIG. 12 is a view showing an example of an acquisition request according to the second embodiment of the present invention. The HTTP request in FIG. 12 assumes the use of Amazon S3 (registered trademark) as an example of the object storage.

(S309) The object storage access unit 353 reads the heartbeat information file and notifies the heartbeat communication unit 352 of the result.

(S310) The heartbeat communication unit 352 notifies the cluster control unit 351 that a heartbeat from the other server is received.

(S311) The cluster control unit 351 updates the alive status of the other server to "normal state".

In this operation, the server 300 and the server 350 can monitor the alive status of each other's server through the object storage 100.

It should be noted that, although a cluster composed of two servers is described as an example in the above embodiments, the present invention is applicable also to a cluster composed three or more servers. To be specific, this can be implemented by executing the processing after Step S303 in FIG. 10 repeatedly the number of times corresponding to the number of other servers (other than its own server).

As described above, it possible to overcome network partition even when a plurality of servers forming a cluster system are located in remote locations. Further, while a shared disk is high capacity (including the capacity not used) and expensive, an object storage allows the use of only the amount needed at a low price. It is thereby possible to reduce the cost to construct a cluster system compared with the existing techniques of dealing with network partition using a shared disk (disk heartbeat).

While use of a shared disk requires overcoming various constraints on a hard disk, an OS, a device driver and the like, use of an object storage only requires supporting HTTP communication. It is thereby possible to reduce constraints on servers that form a cluster system compared with the existing techniques of dealing with network partition using a shared disk (disk heartbeat).

Note that a part of the second embodiment can be described as follows. Specifically, the cluster control unit holds the second state information acquired by the acquisition request unit, and then determines the operating state of the other calculator by comparing the second state information when acquisition of the second state information is successful with the held second state information.

Further, the cluster control unit determines the operating state of the other calculator based on the path of an object acquired from the object storage.

Third Embodiment

A third embodiment is a modified example of the above-described second embodiment.

Communication of heartbeat information through an object storage places a heavier load on a communication channel compared with the existing heartbeat communication. Further, some object storages require usage fees depending on the size of stored data or the number of HTTP requests when accessing data. It is therefore desirable to minimize communication of heartbeat information through an object storage. However, merely reducing the number of times of communicating heartbeat information causes delay in detecting the occurrence of a failure, which increases out-of-service time.

In view of the above, in the third embodiment, communication of heartbeat information through an object storage can be performed at appropriate frequency depending on the situation. Specifically, the calculator is connected to the other calculator through a first communication line for mutually monitoring the operating state, and includes a storage unit that stores a monitoring interval in association with each of a plurality of communication lines including a second communication line with the object storage and the first communication line. This enables flexible monitoring in accordance with the type of a plurality of communication lines.

The calculator further includes an interval adjustment unit that adjusts the monitoring interval associated with other communication lines when any of the plurality of communication lines becomes unavailable. This enables maintaining a certain service level.

The storage unit further stores whether adjustment of the monitoring interval is needed or not in association with each of the plurality of communication lines, and the interval adjustment unit makes adjustment of each communication line, among the other communication lines, based on need/no need of adjustment. This enables fine adjustment of the monitoring interval.

Figure 13:
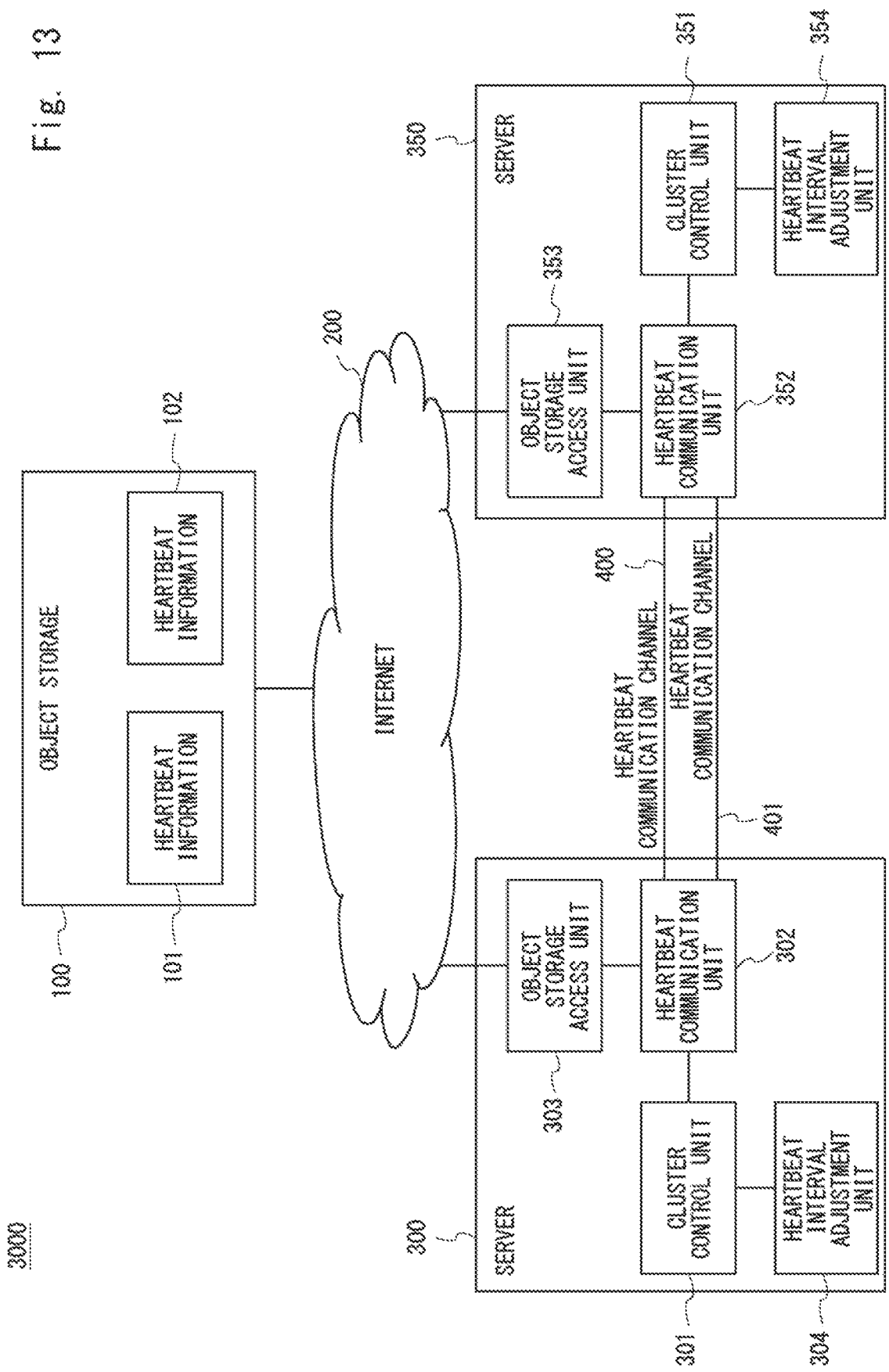
FIG. 13 is a block diagram showing the configuration of a cluster management system according to a third embodiment of the present invention.

FIG. 13 is a block diagram showing the configuration of a cluster management system 3000 according to the third embodiment of the present invention. The cluster management system 3000 is a modified version of the cluster management system 2000. To be specific, the server 300 and the server 350 are connected through two heartbeat communication channels 400 and 401. Further, a heartbeat interval adjustment unit 304 is added to the server 300, and a heartbeat interval adjustment unit 354 is added to the server 350. In addition, a heartbeat communication channel table, which is not shown, is stored in each of the server 300 and the server 350.

FIG. 14 is a view showing an example of a heartbeat communication channel table according to the third embodiment of the present invention. The heartbeat communication channel table shows channels and the like used for communication of heartbeat information in the cluster management system 3000. The heartbeat communication channel table contains information such as the type of a channel, the (alive) status of a server at the other end determined using the channel, the interval of heartbeat communication, and the need/no need of adjustment of the communication interval. In the example of FIG. 14, it is defined to perform heartbeat communication using the heartbeat communication channels 400 and 401 at an interval of 10 seconds and perform heartbeat communication using the object storage 100 at an interval of 60 seconds.

The cluster control units 301 and 351 make an inquiry to the heartbeat interval adjustment unit 304 and acquire a heartbeat communication interval at the startup of a cluster system in the servers 300 and 350. After that, the cluster control units 301 and 351 perform heartbeat communication according to the acquired communication interval.

Figure 15:
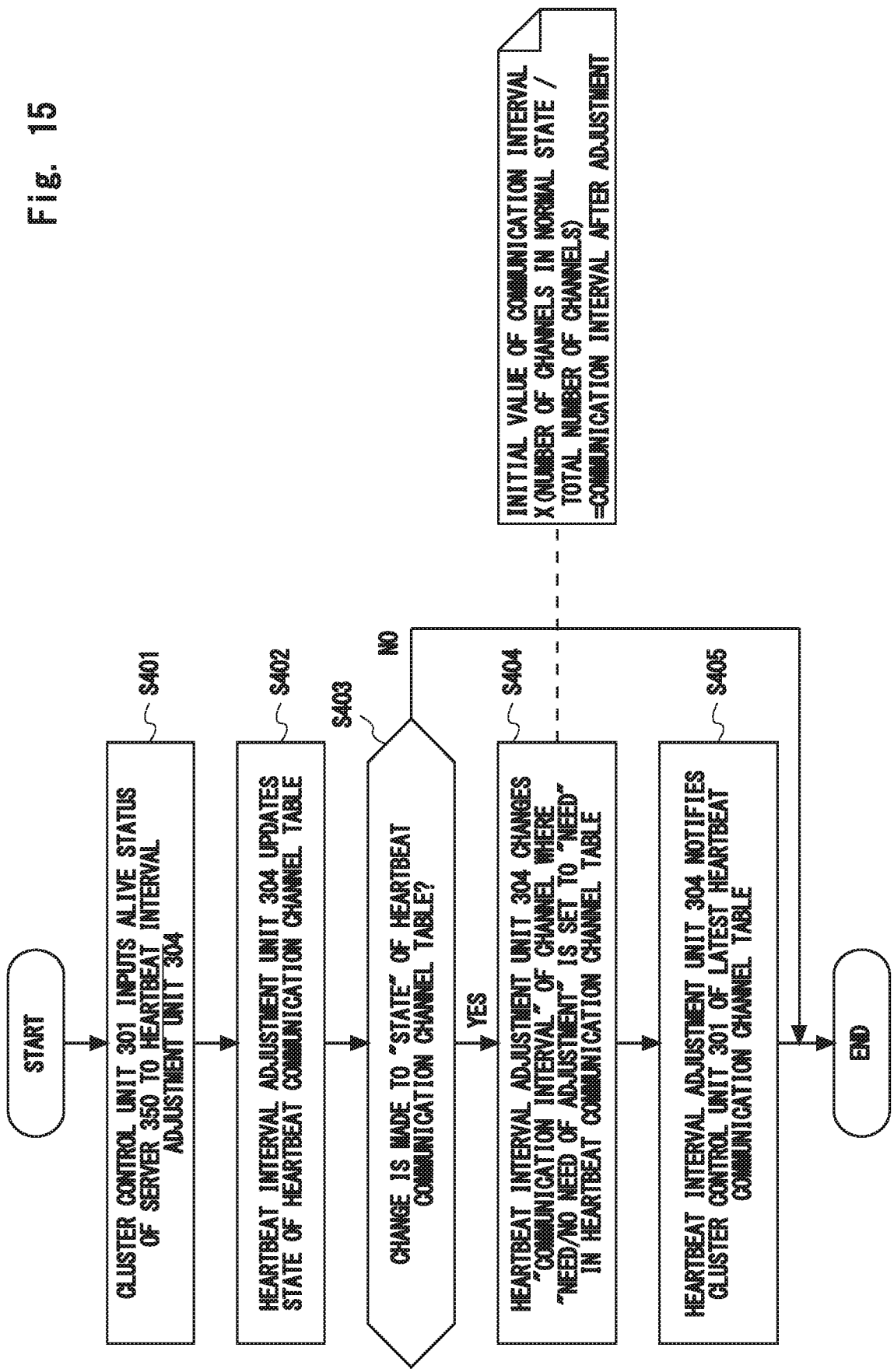
FIG. 15 is a flowchart showing the flow of a heartbeat interval adjustment process according to the third embodiment of the present invention.

FIG. 15 is a flowchart showing the flow of a heartbeat interval adjustment process according to the third embodiment of the present invention. Note that the heartbeat interval adjustment process by the server 350 is performed in the same manner.

Figure 4:
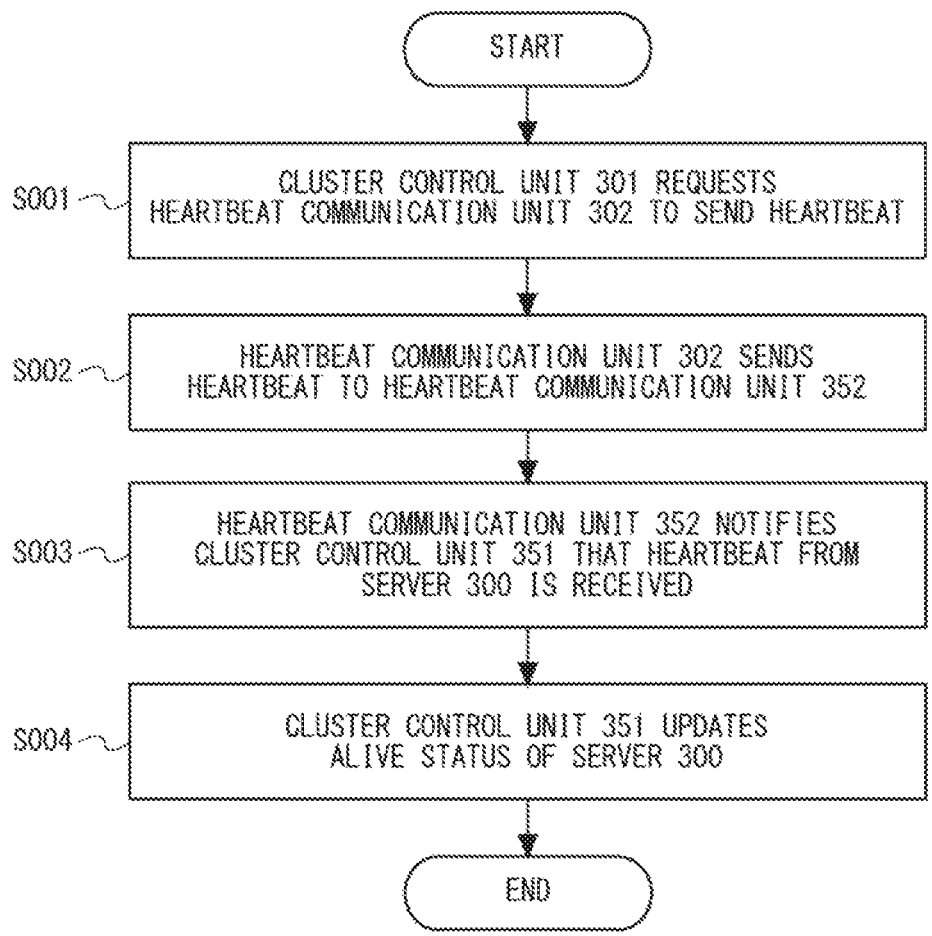
FIG. 4 is a flowchart showing the flow of a heartbeat communication process.
Figure 5:
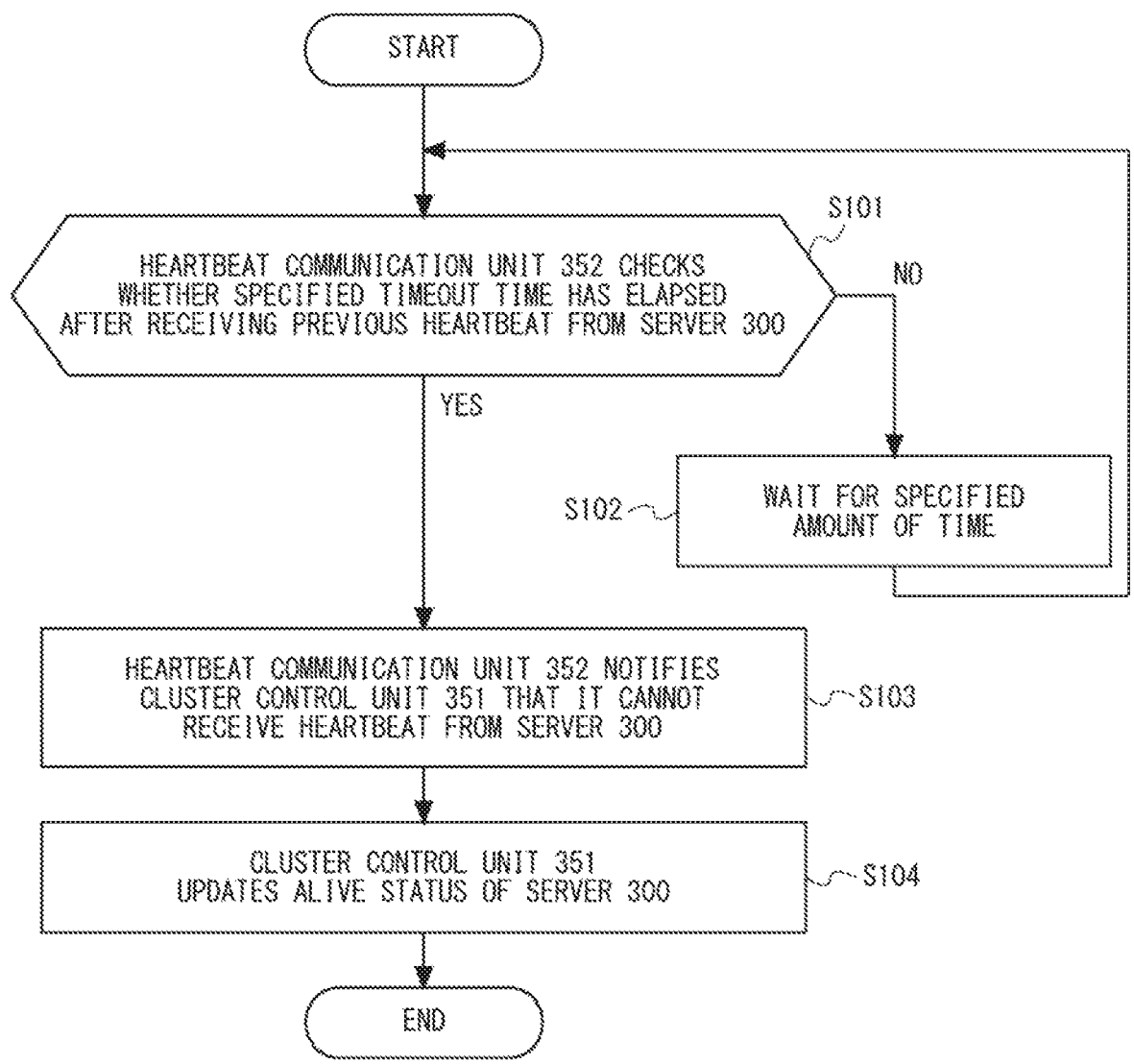
FIG. 5 is a flowchart showing the flow of a process in the event of timeout
Figure 10:
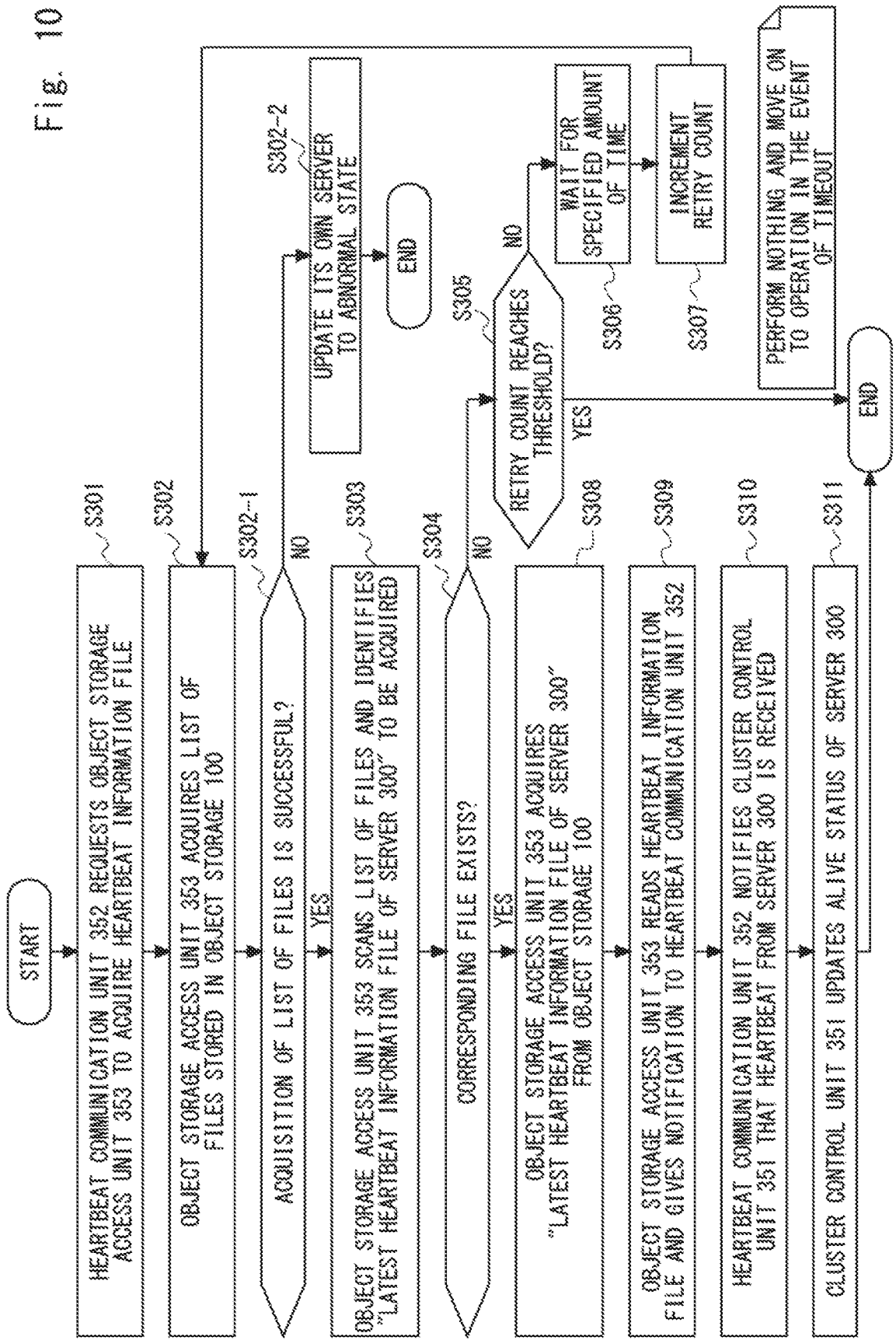
FIG. 10 is a flowchart showing the flow of a heartbeat communication process (acquisition) through an object storage according to the second embodiment of the present invention.

(S401) After performing Step S004 in FIG. 4, Step S104 in FIG. 5, and Step S311 in FIG. 10 and when updating the alive status of the server 350 at the other end, the cluster control unit 301 inputs information about the latest alive status also to the heartbeat interval adjustment unit 304.

(S402) In response to input from the cluster control unit 301, the heartbeat interval adjustment unit 304 updates the state of the heartbeat communication channel table.

(S403) The heartbeat interval adjustment unit 304 determines whether there is a change in "state" of the heartbeat communication channel table. When there is a change, the process proceeds to Step S404, and when there is no change, the process ends.

(S404) The heartbeat interval adjustment unit 304 changes "communication interval" of a channel where "state" is set to "normal", and "need/no need of adjustment" is set to "need" in the heartbeat communication channel table. Adjustment of the communication interval is made based on the following equation:

$$\text{Initial value of communication interval} \times (\text{number of channels in normal state/total number of channels}) = \text{communication interval after adjustment}$$

For example, it is assumed that a failure occurs in the heartbeat communication channel 400, and heartbeat communication using this channel becomes unavailable. At this time, the state of "ID: 400" in the heartbeat communication channel table is updated to abnormal. Then, the communication interval of the object storage with "ID: 100" is changed to 60 seconds×2/3=40 seconds. On the other hand, for the heartbeat channel with "ID: 401", adjustment of the communication interval is not made because "need/no need of adjustment" indicates no need.

Further, when a failure occurs also in the heartbeat communication channel 401, the communication interval of the object storage with "ID: 100" is changed to 60 seconds× 1/3=20 seconds.

(S405) After updating the communication interval in the heartbeat communication channel table, the heartbeat interval adjustment unit 304 notifies the cluster control unit 301 of the latest information. The interval of heartbeat communication is thereby changed after that.

In this operation, when alive monitoring using a normal heartbeat channel functions normally, communication of heartbeat information through the object storage is reduced, and it is thereby possible to suppress an increase in loads on the communication channel and usage fees of the object storage. On the other hand, when alive monitoring using a normal heartbeat channel is abnormal, the communication interval is shortened, and it is thereby possible to timely check the alive status of the server at the other end.

OTHER EMBODIMENTS

It should be noted that the present invention is not limited to the above-described embodiment and may be varied in many ways within the scope of the present invention.

Further, although the present invention is described as a hardware configuration in the above embodiments, the present invention is not limited thereto. The present invention may be implemented by causing a CPU (Central Processing Unit) to execute a computer program.

In the above-described example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The whole or part of the exemplary embodiments disclosed above can be described as, but not limited to, the following supplementary notes.

(Supplementary Note 1)

A calculator comprising:

a storage request unit configured to request an object storage to store first state information indicating a normal state of the calculator, the object storage being configured to manage data on an object-by-object basis;

an acquisition request unit configured to request the object storage to acquire second state information indicating a normal state of an other calculator forming a cluster together with the calculator; and a cluster control unit configured to perform cluster control based on a result of storing the first state information and a result of acquiring the second state information, wherein when a result of acquiring the second state information is not a latest result, the acquisition request unit requests acquisition of the second state information a specified number of times.

(Supplementary Note 2)

The calculator according to Supplementary Note 1, wherein when storing the first state information has failed, the cluster control unit determines that the calculator is abnormal and performs cluster control.

(Supplementary Note 3)

The calculator according to Supplementary Note 1 or 2, wherein the calculator is connected to the other calculator through a first communication line for mutually monitoring an operating state, and the calculator includes a storage unit configured to store a monitoring interval in association with each of a plurality of communication lines including a second communication line with the object storage and the first communication line.

(Supplementary Note 4)

The calculator according to Supplementary Note 3, further comprising:

an interval adjustment unit configured to adjust the monitoring interval associated with other communication lines when any of the plurality of communication lines becomes unavailable.

(Supplementary Note 5)

The calculator according to Supplementary Note 4, wherein the storage unit further stores need/no need of adjustment of the monitoring interval in association with each of the plurality of communication lines, and the interval adjustment unit makes adjustment of each communication line, among the other communication lines, based on the need/no need of adjustment.
(Supplementary Note 6)
The calculator according to any one of Supplementary Notes 1 to 5, wherein the cluster control unit holds the second state information acquired by the acquisition request unit, and then determines an operating state of the other calculator by comparing the second state information when acquisition of the second state information is successful with the held second state information.
(Supplementary Note 7)
The calculator according to Supplementary Note 6, wherein the cluster control unit determines an operating state of the other calculator based on a path of an object acquired from the object storage.
(Supplementary Note 8)
A cluster management system comprising:
an object storage configured to manage data on an object-by-object basis; and
a plurality of calculators configured to be able to communicate with the object storage through a network, wherein
each of the plurality of calculators
requests the object storage to store first state information indicating a normal state of the calculator,
requests the object storage to acquire second state information indicating a normal state of another calculator forming a cluster together with the calculator,
performs cluster control based on a result of storing the first state information and a result of acquiring the second state information, and
requests the acquisition a specified number of times when a result of acquiring the second state information is not a latest result.
(Supplementary Note 9)
A cluster management method comprising:
requesting an object storage to store first state information indicating a normal state of the calculator, the object storage being configured to manage data on an object-by-object basis;
requesting the object storage to acquire second state information indicating a normal state of another calculator forming a cluster together with the calculator;
performing cluster control based on a result of storing the first state information and a result of acquiring the second state information; and
requesting acquisition of the second state information a specified number of times when a result of acquiring the second state information is not a latest result.
(Supplementary Note 10)
A non-transitory computer readable medium storing a cluster management program causing a computer to execute:
processing of requesting an object storage to store first state information indicating a normal state of the calculator, the object storage being configured to manage data on an object-by-object basis;
processing of requesting the object storage to acquire second state information indicating a normal state of another calculator forming a cluster together with the calculator;
processing of performing cluster control based on a result of storing the first state information and a result of acquiring the second state information; and
processing of requesting acquisition of the second state information a specified number of times when a result of acquiring the second state information is not a latest result.
While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2016-184515 filed on Sep. 21, 2016, and the disclosure of which is incorporated herein in its entirety by reference.

REFERENCE SIGNS LIST

1000 CLUSTER MANAGEMENT SYSTEM
2000 CLUSTER MANAGEMENT SYSTEM
3000 CLUSTER MANAGEMENT SYSTEM
10 CALCULATOR
11 STORAGE REQUEST UNIT
12 ACQUISITION REQUEST UNIT
13 CLUSTER CONTROL UNIT
20 CALCULATOR
21 STORAGE REQUEST UNIT
22 ACQUISITION REQUEST UNIT
23 CLUSTER CONTROL UNIT
30 OBJECT STORAGE
40 NETWORK
100 OBJECT STORAGE
101 HEARTBEAT INFORMATION
102 HEARTBEAT INFORMATION
200 INTERNET
300 SERVER
301 CLUSTER CONTROL UNIT
302 HEARTBEAT COMMUNICATION UNIT
303 OBJECT STORAGE ACCESS UNIT
304 HEARTBEAT INTERVAL ADJUSTMENT UNIT
350 SERVER
351 CLUSTER CONTROL UNIT
352 HEARTBEAT COMMUNICATION UNIT
353 OBJECT STORAGE ACCESS UNIT
354 HEARTBEAT INTERVAL ADJUSTMENT UNIT
400 HEARTBEAT COMMUNICATION CHANNEL
401 HEARTBEAT COMMUNICATION CHANNEL

The invention claimed is:

1. A calculator being connected to another calculator through a First communication line for mutually monitoring an operating state, the calculator comprising:
at least one a memory storing instructions, and at least one processor configured to execute the instructions to;
request an object storage to store first state information indicating a normal state of the calculator, the object storage being configured to manage data on an object-by-object basis and being connected to the calculator through a second communication line;
request the object storage to acquire second state information indicating a normal state of the another calculator forming a cluster together with the calculator, the another calculator being connected to the object storage; and
perform cluster control based on a result of storing the first state information and a result of acquiring the second state information,
wherein the processor further configured to execute the instructions to request acquisition of the second state information a specified number of times, when a result of acquiring the second state information is not a latest result, and
wherein the calculator further includes a storage device that is configured to store a monitoring interval in association with each of a plurality of communication lines including the first communication line and the second communication line.

2. The calculator according to claim 1, wherein the processor further configured to execute the instructions to determine that the calculator is abnormal and performs cluster control, when storing the first state information has failed.

3. The calculator according to claim 1,
wherein the processor further configured to execute the instructions to adjust the monitoring interval associated with other communication lines when any of the plurality of communication lines becomes unavailable.

4. The calculator according to claim 3, wherein
the storage device further stores need/no need of adjustment of the monitoring interval in association with each of the plurality of communication lines, and
the processor further configured to execute the instructions to make adjustment of each communication line, among the other communication lines, based on the need/no need of adjustment.

5. The calculator according to claim 1, wherein the processor further configured to execute the instructions to hold the second state information acquired, and then determine an operating state of the another calculator by comparing the second state information when acquisition of the second state information is successful with the held second state information.

6. The calculator according to claim 5, wherein the processor further configured to execute the instructions to determine an operating state of the another calculator based on a path of an object acquired from the object storage.

7. A cluster management method comprising:
requesting an object storage to store first state information indicating a normal state of a calculator, the calculator being connected to another calculator through a first communication line for mutually monitoring an operating state, the object storage being configured to manage data on an object-by-object basis and being connected to the calculator through a second communication line;
requesting the object storage to acquire second state information indicating a normal state of the another calculator forming a cluster together with the calculator, the another calculator being connected to the object storage;
performing cluster control based on a result of storing the first state information and a result of acquiring the second state information; and
requesting acquisition of the second state information a specified number of times when a result of acquiring the second state information is not a latest result and
wherein the calculator further includes a storage device that is configured to store a monitoring interval in association with each of a plurality of communication lines including the first communication line and the second communication line.

8. A non-transitory computer readable medium storing a cluster management program causing a computer to execute:
processing of requesting an object storage to store first state information indicating a normal state of the computer, the computer being connected to another computer through a first communication line for mutually monitoring an operating state, the object storage being configured to manage data on an object-by-object basis and being connected to the computer through a second communication line;
processing of requesting the object storage to acquire second state information indicating a normal state of the another computer forming a cluster together with the computer, the another computer being connected to the object storage;
processing of performing cluster control based on a result of storing the first state information and a result of acquiring the second state information; and
processing of requesting acquisition of the second state information a specified number of times when a result of acquiring the second state information is not a latest result, and
wherein the computer further includes a storage device that is configured to store a monitoring interval in association with each of a plurality of communication lines including the first communication line and the second communication line.

* * * * *